Patented Sept. 18, 1945

2,385,188

UNITED STATES PATENT OFFICE 2,385,188

PROCESS FOR MAKING ALKALI METAL FERRIC PYROPHOSPHATE

Charles F. Booth, Anniston, Ala., assignor to Monsanto Chemical Company, a corporation of Delaware No Drawing. Application June 26, 1943, Serial No. 492,420

15 Claims. (Cl. 23—107)

The object of this invention is to provide a process for the preparation of white alkali metal ferric pyrophosphates, particularly sodium ferric pyrophosphate in a form suitable for enrichment of flour and other food products.

Because of the color of flour and other cereal or food products, it is desirable that addition agents be white, or as nearly colorless as possible, in order to conform to color standards.

Previous methods for producing sodium ferric pyrophosphate have involved the double decomposition reaction of soluble inorganic iron salts with tetrasodium pyrophosphate, the reaction being carried out in aqueous solution. The product made by prior processes has usually consisted of a yellow to reddish brown powder, which is unsuitable for use in the preparation of enriched flour and certain other foods products because of its failure to conform to color standards.

I have now found that sodium ferric pyrophosphate may be precipitated as a white powder which remains substantially white by mixing together a dilute solution of an alkali metal pyrophosphate containing sulfur dioxide and a dilute solution of a soluble ferric salt of an inorganic acid. Suitable ferric salts may comprise the chloride, sulfate, nitrate, etc. The reaction is preferably carried out by adding the soluble iron salt gradually to a hot solution of the sodium pyrophosphate. Upon the addition of such iron salts a precipitate of sodium ferric pyrophosphate is formed which is allowed to agglomerate for a few hours. The slurry of pyrophosphate and solution thus formed is filtered and the product obtained is washed with water to remove soluble salts and dried at a temperature somewhat above 100° C. For the purpose of producing a product which is of a uniform density suitable for addition by mechanical feed devices, the bulk density of the dried product should be maintained within the range of between 0.7 and 1.5 grams per cc. It is possible to vary the bulk density of the product by varying the Fe/$P_2O_5$ ratio in the slurry, the $SO_2$ concentration in the slurry or the amount of $SO_2$ present in the solution during the reaction and the amount of washing. I have found, for example, that the density of the product can be increased by lowering the Fe/$P_2O_5$ ratio in the slurry, by decreasing the concentration of the $SO_2$ in the slurry or the amount of $SO_2$ present during the reaction or by prolonged washing. On the other hand, if the Fe/$P_2O_5$ ratio is raised, the concentration of the $SO_2$ in the slurry or in solution during the reaction is increased or the amount of washing is decreased, then the bulk density of the product is decreased.

Without being limited to precise details, the following example illustrates one method by which my invention may be practiced.

A solution is first prepared consisting of 106 pounds of anhydrous tetrasodium pyrophosphate dissolved in 375 pounds of water at a temperature of 80° C.–85° C. This solution has a concentration of about 22% by weight $Na_4P_2O_7$. This concentration may be varied over the range of from 10% as the lower limit to 30% to 40% as an upper limit. Sulfur dioxide gas is bubbled into this solution until the hydrogen ion concentration has been lowered approximately one unit (based upon pH determinations made on a sample of the solution diluted to 1 per cent anhydrous $Na_4P_2O_7$ content). Approximately 1.35 pounds of $SO_2$ are required to lower the pH to within the range of 9.0 to 9.5 and preferably between the limits of 9.1 to 9.2, which range is the desirable pH range for precipitation.

A second solution is prepared by dissolving ferric chloride crystals in water so that the resulting solution will contain 16.8 pounds of Fe dissolved in 175 pounds of water. The desirable concentration of the ferric chloride is in the neighborhood of 10 per cent although this concentration may be somewhat increased or even decreased with satisfactory results.

The cold (room temperature) solution of ferric chloride is now added to the solution of tetrasodium pyrophosphate under conditions of vigorous agitation. The addition of the ferric chloride solution takes place over a period of from 20–30 minutes; however, a longer or shorter time of addition may be employed. The slurry of solution and precipitate is then filtered to recover the solids which solids are thereafter washed in order to free the material of soluble salts. The washing is carried to a point where the product contains under 1 per cent of chloride.

The product is now dried by heating to a temperature above 100° C. and preferably between 100 and 110° C. The dried material is ground to a fine powder by milling. The yield from the above quantities of material is substantially 100 pounds of product. The product so produced corresponds to the following formula:

$$2Na_4P_2O_7 \cdot Fe_4(P_2O_7)_3 \cdot 8H_2O$$

In carrying our my process it should be pointed out that it is essential to add the $SO_2$ to the alkali metal pyrophosphate solution as a substantially white product is not obtainable if the SO2 is added either to the iron salt solution or to the solution formed by mixing dilute solutions of an alkali metal pyrophosphate and an iron salt of an inorganic salt.

What I claim is:

1. The process for producing an alkali metal ferric pyrophosphate which comprises adding a soluble ferric salt of an inorganic acid to an aqueous solution of an alkali metal salt of pyrophosphoric acid which has been treated with sulfur dioxide.

2. The process for producing sodium ferric pyrophosphate which comprises adding ferric chloride to an aqueous solution of tetrasodium pyrophosphate which has been treated with sulfur dioxide.

3. The process for producing sodium ferric pyrophosphate which comprises mixing together an aqueous solution of ferric chloride and an aqueous solution of tetrasodium pyrophosphate which has been treated with sulfur dioxide.

4. The process for producing sodium ferric pyrophosphate which comprises mixing together an aqueous solution of ferric chloride and an aqueous solution of tetrasodium pyrophosphate which has been treated with sulfur dioxide, said pyrophosphate solution having a pH of from 9.0 to 9.5.

5. The process defined in claim 4, in which the pyrophosphate solution has a pH of from 9.1 to 9.2.

6. The process for producing sodium ferric pyrophosphate which comprises adding a cold aqueous solution of ferric chloride to a hot aqueous solution of tetrasodium pyrophosphate which has been treated with sulfur dioxide, said pyrophosphate solution having a pH of from 9.1 to 9.2.

7. The process for producing sodium ferric pyrophosphate which comprises adding a cold aqueous solution of ferric chloride containing approximately 10 per cent of Fe to an aqueous solution containing approximately 22% by weight of tetrasodium pyrophosphate maintained at a temperature of between 80° C. and 85° C., said pyrophosphate solution having been treated with sulfur dioxide in amount to lower the pH thereof to within the range of from 9.0 to 9.5, and recovering the sodium ferric pyrophosphate by filtration.

8. The process defined in claim 1 wherein ferric sulfate is the soluble ferric salt employed.

9. The process defined in claim 1 wherein ferric nitrate is the soluble ferric salt employed.

10. The process for producing sodium ferric pyrophosphate which comprises adding a cold aqueous solution of ferric chloride containing approximately 10 per cent of Fe to an aqueous solution containing 10 to 40 per cent by weight of tetrasodium pyrophosphate maintained at a temperature of between 80° C. and 85° C., said pyrophosphate solution having been treated with sulfur dioxide in amount to lower the pH thereof to within the range of 9.0 to 9.5, and recovering the sodium ferric pyrophosphate by filtration.

11. The process for producing sodium ferric pyrophosphate which comprises adding a soluble ferric salt of an inorganic acid to an aqueous solution of tetrasodium pyrophosphate which has been treated with sulfur dioxide.

12. The process for producing sodium ferric pyrophosphate which comprises mixing together an aqueous solution of a soluble ferric salt of an inorganic acid and a solution of tetrasodium pyrophosphate which has been treated with sulfur dioxide, said pyrophosphate solution having a pH of 9.0 to 9.5 prior to mixing with said ferric salt solution.

13. The process for producing sodium ferric pyrophosphate which comprising preparing an aqueous solution containing 10 to 40 per cent by weight of tetrasodium pyrophosphate, treating this solution with sulfur dioxide in amount to lower the pH to within the range of from 9.0 to 9.5, and then mixing said treated solution with an aqueous solution of ferric chloride containing about 10 per cent by weight of Fe.

14. The process for producing an alkali metal ferric pyrophosphate which comprises preparing an aqueous solution of an inorganic ferric salt and then adding this solution to an aqueous solution of an alkali metal pyrophosphate solution which has been treated with sulfur dioxide.

15. The process defined in claim 13 in which the pH of the pyrophosphate solution is within the range of 9.1 to 9.2.

CHARLES F. BOOTH.